March 2, 1926.
E. H. LORENZ
1,575,370
GLASS DELIVERING APPARATUS
Filed April 7, 1919
4 Sheets-Sheet 1
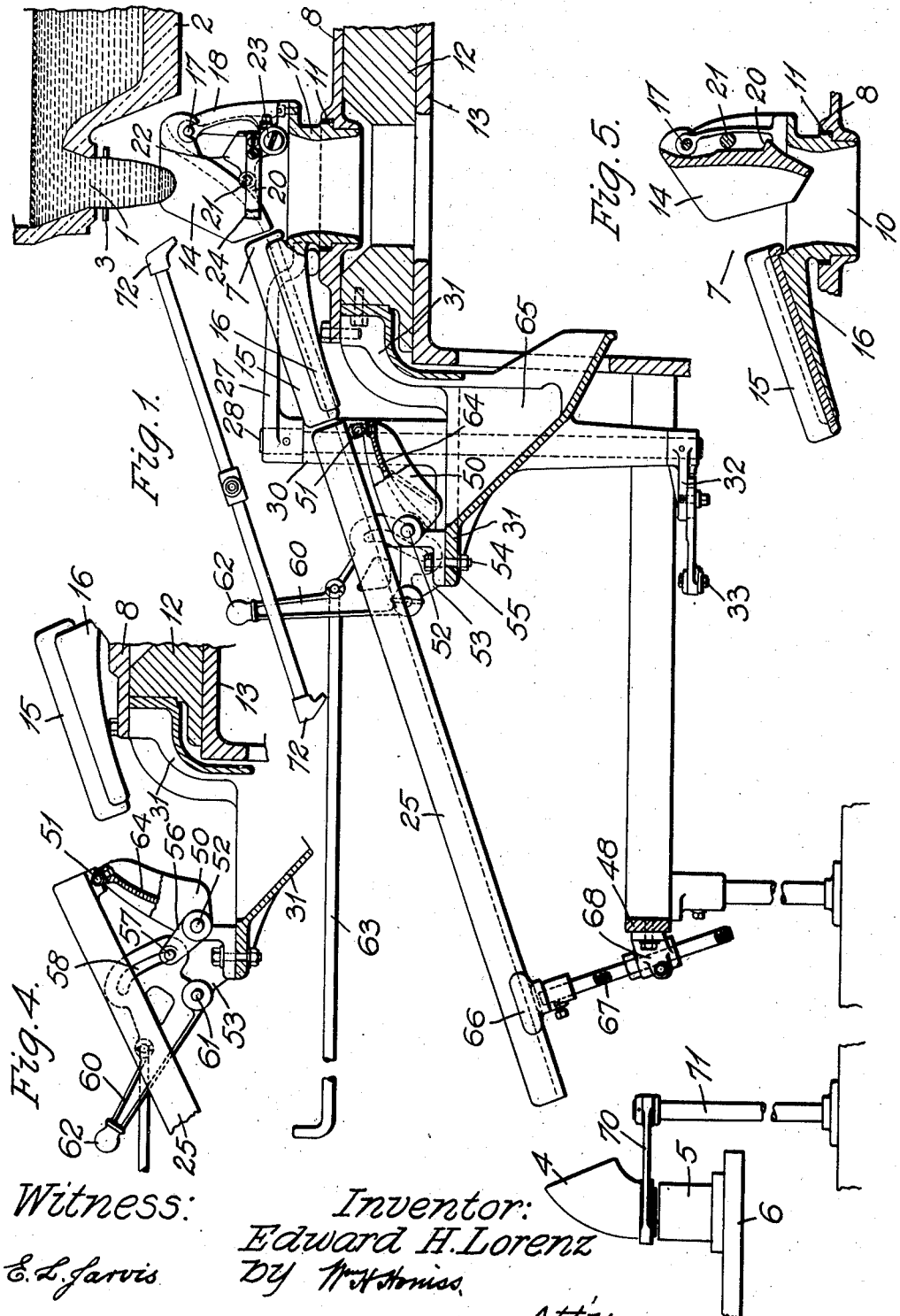
Witness:
E. L. Jarvis
Inventor:
Edward H. Lorenz
by W. H. Henniss
Atty.

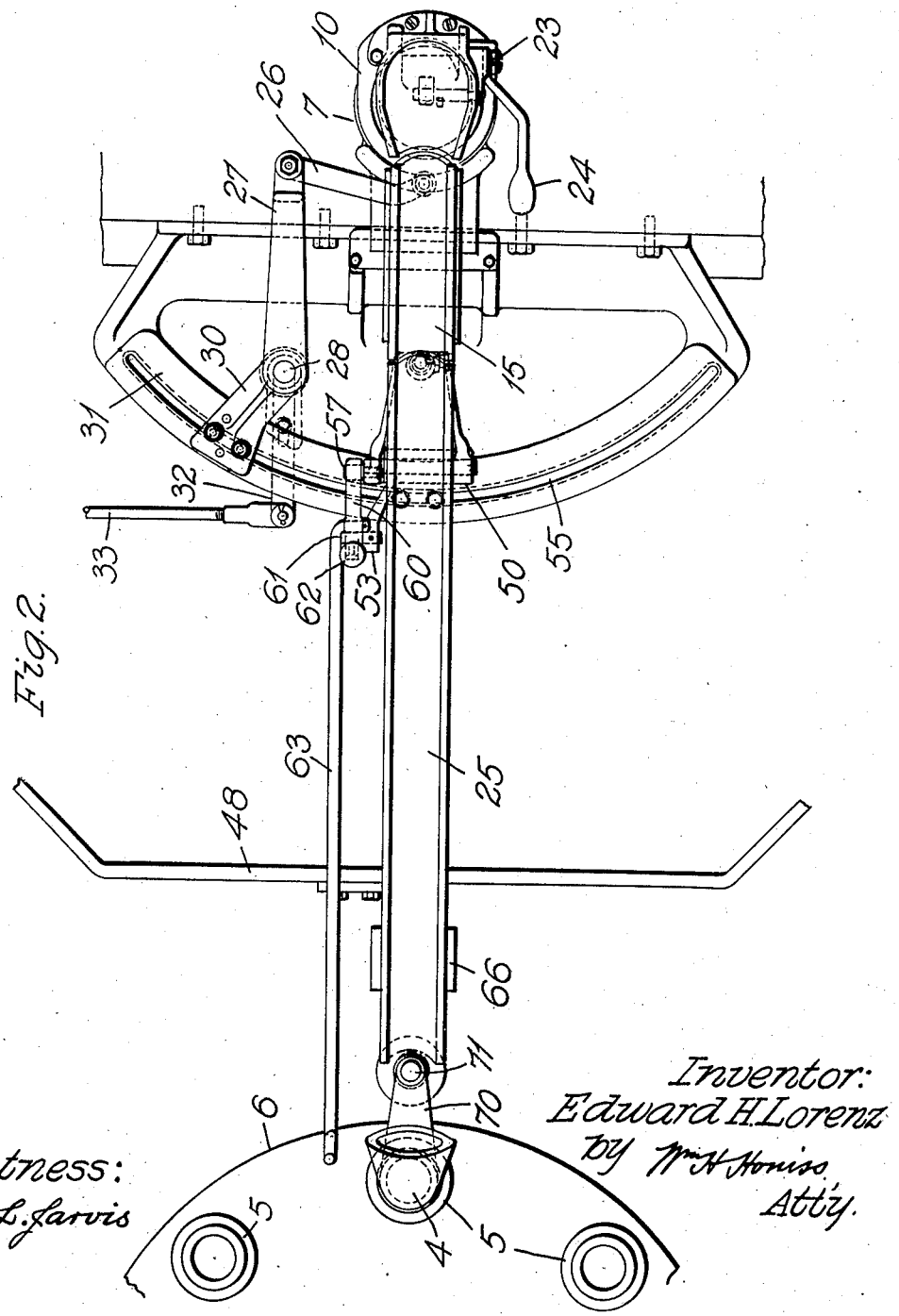

March 2, 1926.
E. H. LORENZ
1,575,370
GLASS DELIVERING APPARATUS
Filed April 7, 1919    4 Sheets-Sheet 3
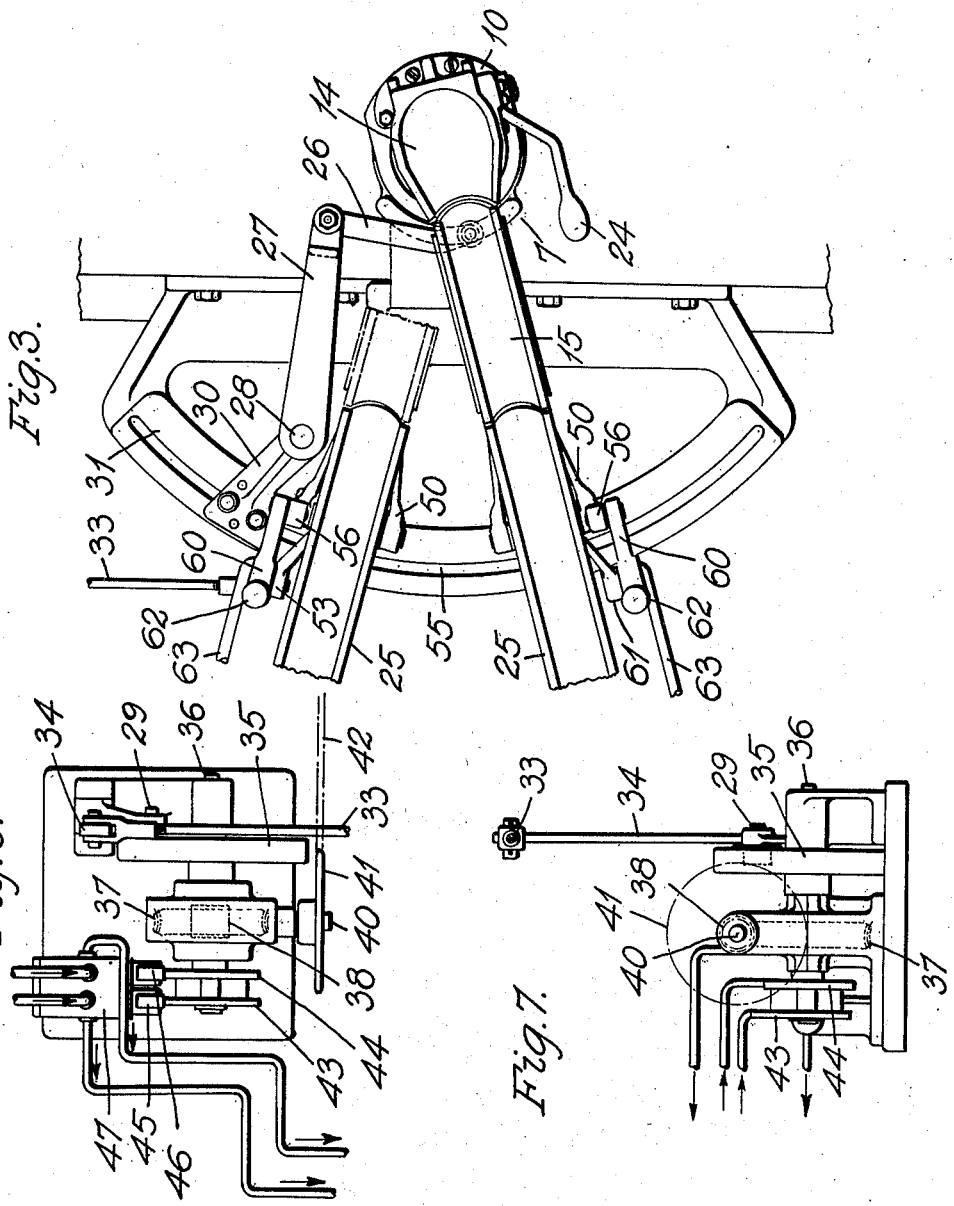
Witness:
E. L. Jarvis
Inventor:
Edward H. Lorenz
by
Atty.

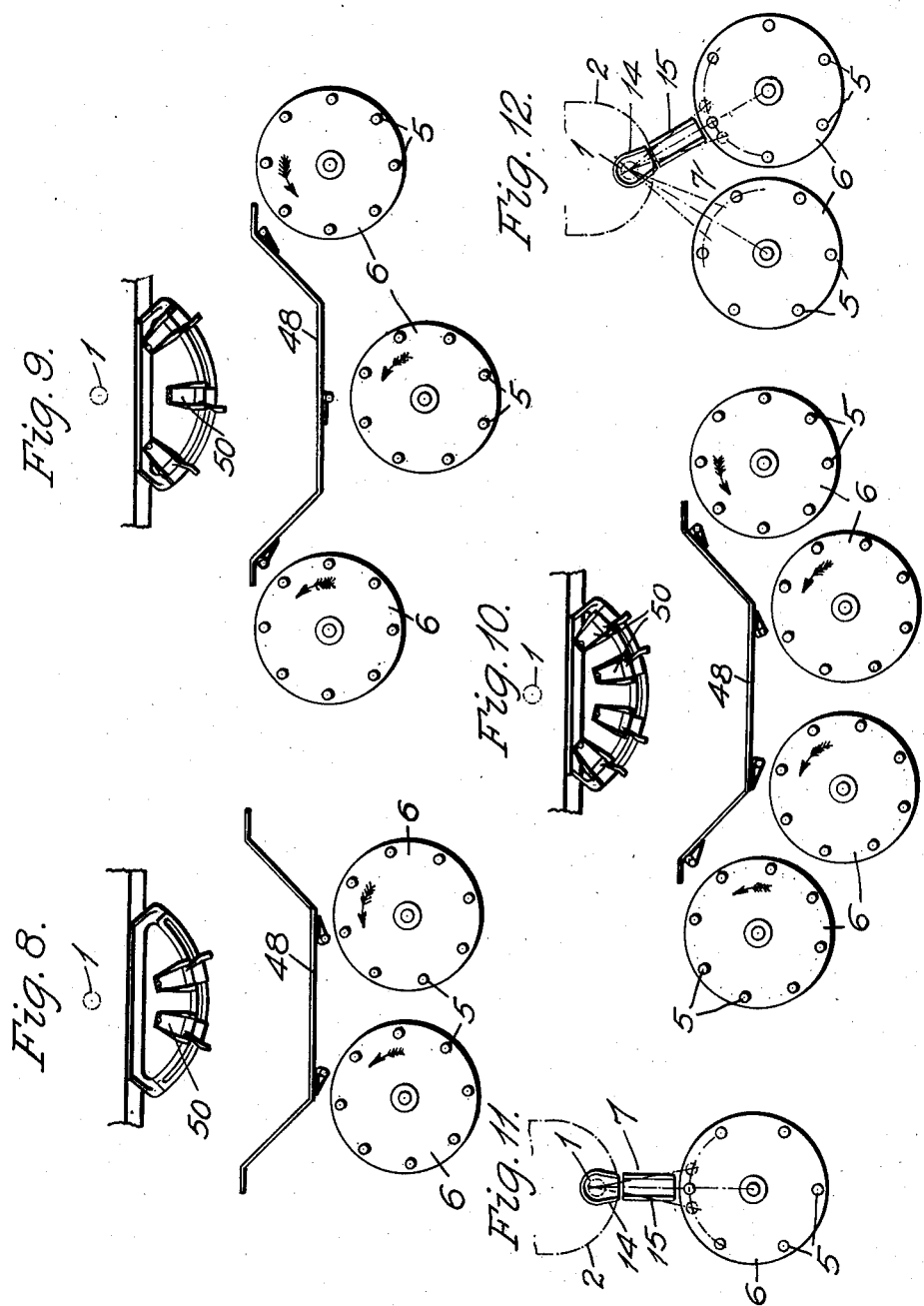

Patented Mar. 2, 1926.

1,575,370

UNITED STATES PATENT OFFICE.

EDWARD H. LORENZ, OF WEST HARTFORD, CONNECTICUT, ASSIGNOR TO HARTFORD-EMPIRE COMPANY, OF HARTFORD, CONNECTICUT, A CORPORATION OF DELAWARE.

GLASS-DELIVERING APPARATUS.

Application filed April 7, 1919. Serial No. 287,966.

*To all whom it may concern:*

Be it known that I, EDWARD H. LORENZ a citizen of the United States, residing at West Hartford, in the county of Hartford and State of Connecticut, have invented new and useful Improvements in Glass-Delivering Apparatus, of which the following is a specification.

The invention relates to apparatus for delivering or conveying charges of molten glass from a feeding means or furnace to suitable mechanism for shaping or treating the glass.

In the apparatus herein disclosed as a preferred embodiment of the invention, the glass charges are delivered automatically and periodically to the molds of one or more forming machines, and its delivering movements are co-ordinated with the movements of the forming machines in such a manner that the charges of glass are delivered to the molds in the proper time relation to the movements of the molds, usually during intermissions in their movements.

Means are provided for temporarily arresting the delivery of the charges to any or all of the forming machines at will, without arresting the regular issuance of the charges from the furnace or feeding means, thus maintaining the thermal and physical properties of the glass necessary for proper feeding and working. If the regularity of issuance be interrupted, these properties of the glass would be altered, resulting in a considerable loss of glass and of production while getting the glass again into the proper working condition. This feature constitutes an important object of the invention.

Figure 1 of the drawings is a side view partly in section showing the mechanism in position to deliver charges of glass from a furnace or feeding means to the mold of a forming machine. Fig. 2 is a plan view of the apparatus of Fig. 1, showing but one of the conduits in position. Fig. 3 is a fragmentary plan view showing the arrangement for delivering to two conduits. Fig. 4 is a detail view of the mechanism for raising the upper ends of the conduits and to deflect the charges from their individual forming machines to the cullet pit. Fig. 5 is a sectional view of a part of the distributer showing the receiver thereof in its lowered position whereby all of the glass charges from the furnace or feeding means are allowed to fall to the cullet pit. Figs. 6 and 7 are plan and end views respectively of the operating mechanism by which the movements of the forming machines and the distributer are co-ordinated and timed. Figs. 8, 9 and 10 show diagrammatically the preferred arrangements by which delivery of glass charges may be made to two, three, or four forming machines, from a single furnace outlet or feeding means. Figs. 11 and 12 show diagrammatically the delivery of charges by the distributer direct to one and two mold tables respectively, which may rotate continuously.

In Fig. 1 of the drawings the apparatus is shown in position to deliver charges of glass, issuing from the outlet 1 of a furnace or feeding means 2, and severed if desired by shears 3, through a funnel 4 into the molds 5 of a forming machine 6.

The distributer 7 is mounted for swinging movement upon a saddle 8, by means of an annular support 10 provided with a step bearing 11. The saddle 8 is supported upon the base 12 which in turn is mounted upon a suitable frame 13. Openings are provided in the support 10, base 12 and frame 13, so that when the receiver 14 is in the position of Fig. 5, the charges will fall by gravity through these openings into a cullet pit or other suitable receptacle.

The swinging support 10 is preferably located with its vertical axis of swing beneath and in substantial alignment with the flow outlet 1, so that the charges contact uniformly with the same portion of the receiver 14 in whatever horizontal direction it may be turned when the receiver is in operative position (Fig. 1); while the annular form of the support 10 leaves a clear opening through which the glass falls vertically when the deflector 14 is out of operative position (Fig. 5), thus enabling the axis of swing to be located beneath the outlet, without offering any physical obstruction to the free fall of the glass through the support.

The distributor 7 comprises the movable receiver 14 and the short trough 15, the latter being mounted in a bracket 16 of the support 10. The receiver 14 is pivoted for vertical swinging movement on a pin 17 in a standard 18 on the support 10. A lug 20 is formed on the under side of the receiver 14, and coacts with a roller or pin 21 on an arm 22 adjustably mounted upon a shaft 23. The shaft 23 is journalled in the standard 18 and is oscillated by a handle 24 fast thereon. The pivotal mounting of the receiver is such that when in the position shown in Fig. 1, the glass charges issuing from the furnace are guided by the receiver onto the short trough 15. When the receiver is lowered (Fig. 5) by raising the handle 24, the glass charges fall past the receiver and through the openings into the cullet pit.

The distributor 7 oscillates horizontally upon the step bearing 11 in a predetermined order and time to distribute the charges to a plurality of conduits 25 which deliver the glass charges to the forming machinery. To thus move the distributor there is attached to the support 10 one end of a link 26, the opposite end of which is pivoted to the end of an arm 27 fast to the upper end of a vertical rock shaft 28 carried in the pillar 30 bolted to the bracket 31. Fast to the lower end of the shaft 28 is the arm 32, the end of which is connected by the link 33 to the vertical arm 34 of a timing device, Figs. 6 and 7, by which the movements of the distributor 7 and the forming machinery are co-ordinated. A roller 29 on the arm 34 coacts with a cam 35 fast to the shaft 36. A worm wheel 37 is keyed to the shaft 36 and is driven by the worm 38 on the shaft 40. This shaft is driven by a sprocket wheel 41, rotated by the chain 42 which is driven at a proper speed to co-ordinate the movements of the shears and the distributor. Cams 43 and 44 are adustably mounted on the shaft 36 and by means of push rods 45 and 46 operate slide valves in a cylinder 47, thereby controlling fluid pressure operated means for the forming machines.

By properly shaping and timing the cams 43, 44 and 35 and by regulating the speed of the driving chain, the operation of the shears, the movements the distributor and the forming machinery are coordinated.

The conduits 25 are radially disposed from the furnace outlet, and are inclined downwardly toward their delivery ends. The upper ends of the conduits are supported for raising and lowering movements and lateral adjustment upon the bracket 31 and the lower ends of the conduits are adjustably mounted for height upon the bar 48. Since the several conduits are alike only one of them will be specifically described.

For raising each conduit individually to stop delivery to its forming machine, and deflect its charges to the cullet pit, the upper end of the conduit 25 is pivotally connected to one end of a lever 50 by the ball and socket hinge 51. The opposite end of the lever 50 is fast to a pin 52 carried in the bracket 53 which is adjustably secured to the bracket 31, by means of the bolts 54 passing through the slot 55. An arm 56 (Fig. 4) is fast on the pin 52 and carries a roller 57 working in the cam groove 58 formed in an operating lever 60 pivoted at 61 on the bracket 53. The lever 60 is provided with a handle 62 within easy reach of the attendant, and a rod 63 extending to the glass forming machine enables it to be operated from that point. For normal delivery the handle 62 is in the position shown in Fig. 1. To interrupt the delivery, it is moved to the position of Fig. 4, in which position a curved deflector 64, formed on the under side of the lever 50, deflects the charges from the short trough 15 to the trough 65 and thence to the cullet pit.

In order to regulate the trajectory and speed of the glass charges when they leave the conduit, the lower end thereof is adjustable for height in a yoke 66 on the end of a rod 67. The lower end of this rod is adjustably and slidably supported in a split bracket 68 bolted to the bar 48 or other stationary part of the delivery device.

A funnel 4 is mounted adjacent each forming machine to direct the glass charge from the conduit 25 to the molds 5. The funnel 4 is supported by a bracket 70, mounted on the upper end of a column 71, and is located over the stopping or charging position of the molds.

The glass receiving surfaces of the distributor and of the conduits 25 may be sprayed from atomizing nozzles 72, or other suitable means with water or other fluid, which is converted by the heat of the charges into a lubricating film of steam on which the charges slide smoothly and rapidly from the furnace to the molds.

In Figs. 8, 9 and 10 is shown diagrammatically an arrangement associating two, three or four forming machines around a single furnace or feeding machine so that they may be fed automatically and periodically by the delivery device. The arrangement by which the two forming machines shown in Fig. 8 may be fed is fully illustrated in Fig. 3. It is obvious that if it is desired to feed three or four machines, as shown in Figs. 9 and 10, it is only necessary to increase the number of conduits and so shape the cam 35 that a proper motion will be given to the distributer 7 to cause it to deliver to the conduits the charges of glass intended for the individual forming machines.

In cases where the number of machines or other conditions permit the machines to be set closer to the furnace outlet, the conduits 25 may be dispensed with, and if necessary the trough 15 or the receiver 14 of the distributer 7 may be lengthened to deliver the charges directly to the molds of one or more forming machines, as shown in Figs. 11 and 12 respectively. By properly shaping the cam 35, the distributer 7 will be caused to deliver the charges successively to the molds of two or more forming machines shown in Fig. 12.

The forming machines may travel intermittently or continuously, and in the latter case the distributer 7 may be caused to travel with the molds for a short time to maintain alignment therewith while delivering, as indicated in dotted lines in Figs. 11 and 12. This movement of the distributer can be timed by properly shaping the cam 35 to impart the necessary oscillations to the distributer.

The operation is as follows:—Assuming the parts to be in the position shown in Figs. 1 and 3, and that the forming machine 6 carrying the molds or receptacles 5 has come to rest with one of the molds immediately beneath the funnel 4, and that charges of glass are being periodically fed from the furnace outlet or other feeding means 2, and that a suitable fluid film or lubricant is being sprayed on the distributer and the conduits, the charges so fed will be deflected by the receiver 14 onto the short trough 15, whence they will travel along the conduit 25 into the funnel 4 and mold 5 immediately thereunder. The distributer is then moved horizontally upon its step bearing 11 by means of the cam 35 and mechanism actuated thereby, to the position shown in dotted lines in Fig. 3, whereupon a charge of glass is delivered to the other conduit 25 and thence to the forming machine associated therewith.

To arrest the delivery of the charges to all of the forming machines, the handle 24 is moved upwardly, thereby permitting the receiver 14 to lower under its weight to the position shown in Fig. 5. All of the charges delivered by the feeding means are thus allowed to fall into the cullet pit. To resume delivery of the charges to the forming machines, a reverse movement of the handle 24 will restore the receiver to its receiving position as shown in Fig. 1.

By operating the handles 62 any of the individual conduits may be raised to the position of Fig. 4, thus stopping the delivery of charges to the corresponding machines, by deflecting the charges to the cullet pit. Normal delivery of charges will be continued to those machines whose conduits remain in the position of Fig. 1.

It will be understood that the invention is not limited to the particular arrangement herein shown and described, but may be modified in various ways within the scope of the invention, to adapt it to various conditions of service.

I claim:—

1. In apparatus for delivering molten glass, a delivering member mounted for actuation in different planes, in one of which planes the member may be selectively actuated to render it operative or inoperative as a delivering member.

2. In apparatus for delivering molten glass, a delivering member mounted for swinging movements in different planes, in one of which planes the member may be selectively swung to render it operative or inoperative as a delivering member.

3. In apparatus for delivering molten glass, a delivering member mounted for horizontal and vertical actuation, whereby one of said actuations selectively renders the apparatus operative or inoperative as to its delivering function.

4. A glass delivery apparatus comprising a plurality of glass delivering members, said members being mounted for actuation in different planes whereby actuation of one of said members in its plane selectively renders the delivering apparatus operative or inoperative.

5. Apparatus for the delivery of molten glass made in sections, one of which is mounted for movement in a substantially vertical direction into and out of glass delivering relation to an adjoining section, whereby glass delivered by one of said sections is not received by the other sections.

6. A conduit for delivering molten glass comprising a plurality of movable sections located in delivering continuity and means for moving one of said sections verticallly in respect to the other to interrupt their delivering continuity.

7. The combination with means for feeding charges of glass downwardly, of glass delivering apparatus located in the path of the downwardly moving charges, a portion of said apparatus being movable in one direction to distribute said charges and movable in another direction to discontinue the distribution of said charges.

8. The combination with an outlet for discharging charges of glass, of apparatus for receiving the glass and delivering it to a plurality of stations comprising a distributer mounted to swing horizontally about an axis beneath said outlet and having a receiving portion adapted to be moved independently of the said swinging movement, into and out of receiving position.

9. Means for delivering charges of glass from a feeding means to a plurality of forming machines including a glass delivering device mounted for swinging movement about an axis beneath said feeding means, a part of said delivering device being movable, independently of said swinging movement, to arrest the delivery of the charges to the forming machines.

10. The combination with means for feeding charges of glass downwardly, comprising a receptacle for the glass having an orifice through which the glass issues, and means for severing mold charges from the issued glass, of a glass delivering apparatus located in the path of the downwardly moving charges, a portion of said glass delivering apparatus being horizontally movable in one direction to distribute said charges and movable in a direction transverse of the distributing movement to discontinue the distribution of said charges.

11. A chute for delivering molten glass comprising a plurality of movable sections located in delivering continuity, a support common to said sections, means for moving said sections in unison upon said support, and means for moving one of said sections out of said delivering continuity independently of its movement upon said support.

12. A chute for delivering molten glass comprising a plurality of movable sections located in delivering continuity, a support common to said sections, means for moving said sections in unison upon said support and means for moving one of said sections vertically out of delivering continuity with another section, independently of its movement on said support.

13. The combination with means for feeding molten glass in charges, of a plurality of forming machines, a sectional glass delivering device adapted to deliver the said charges of glass from the feeding means to the forming machines, a pivotal support for the said device disposed beneath the said feeding means, means for moving the sectional device periodically about said pivotal support to deliver said charges to said forming machines, one of the sectional parts being also movable out of delivering relation, to arrest the delivery of the glass charges.

14. In a glass delivering apparatus, the combination of a distributer and a plurality of conduits located in co-operative relation to the distributer, and means for moving the conduits out of co-operative relation with the distributer at will.

15. In a glass delivering apparatus, the combination of a distributer and a plurality of conduits located in co-operative relation to the distributer, and means for moving the conduits at will independently of each other out of co-operative relation with the distributer.

16. A glass delivering apparatus adapted to deliver charges of glass from a glass feeding means to a forming machine, comprising a plurality of conduits and means for moving any of the conduits vertically in respect to the other conduits.

17. A glass delivering apparatus comprising a distributer and a conduit adapted to co-operate with each other, means for moving the distributer horizontally in respect to the conduit and means for moving the conduit vertically relative to the distributer.

18. The combination with means for feeding molten glass in charges, of a glass delivering device, comprising a distributer and a conduit, means for discontinuing the delivery of the glass by the distributer, and means independent of the distributer and forming a part of the conduit for discontinuing the delivery of the charges to the conduit.

19. A glass delivering apparatus adapted to deliver charges of glass from a feeding means to forming machinery comprising a distributer and a conduit, arranged to deliver the glass charges from the distributer to the conduit, and means for moving said conduit relative to said distributer to arrest the delivery of said charges to said conduit.

20. A glass delivering apparatus adapted to deliver charges of glass from a feeding means to forming machinery, comprising a distributer and a conduit, the distributer receiving the glass charges and delivering them to said conduit, whereby they are delivered to said forming machinery and means for moving the conduit relative to the distributer thereby arresting the delivery of the charges from the distributer to the forming machinery.

21. The combination with means for feeding molten glass, a glass delivering apparatus comprising a distributer and a plurality of conduits, the distributer being located beneath said feeding means and adapted to receive and distribute the glass to the conduits, and means forming a part of the distributer and movable relative thereto for discontinuing at will the distribution of the glass to the conduits.

22. The combination with means for feeding charges of molten glass, of a glass delivering apparatus, including a swinging distributer located beneath said feeding means, and a plurality of conduits, the distributer being adapted to receive and distribute the glass charges to the conduits, and means forming a part of the swinging distributer and independently movable relative thereto, for discontinuing the distribution of the glass charges by the distributer.

23. A glass delivering apparatus comprising a distributer mounted for swinging movement, and a plurality of conduits radially disposed in respect to the distributer and adjacent the path of movement thereof, and automatic means for swinging the distributer in a predetermined order and time to present the said distributer periodically to each of the said conduits, and means for moving the said conduits into and out of coactive relation to the distributer.

24. In a glass delivering apparatus, the combination of a distributer, and a conduit located in co-operative relation therewith and means including a deflector for moving said conduit at will out of co-operative relation with the distributer.

25. A glass delivering apparatus, comprising an inclined chute for receiving the glass, mounted to swing about a substantially vertical axis, and also mounted to swing out of operative position in a substantially vertical plane about a pivot located near its upper end.

26. Apparatus for intermittently delivering molten glass discharged from an outlet, comprising a chute mounted to swing about a fixed axis substantially coincident with the path of discharge of the glass, and also mounted to swing into and out of said path upon another axis located substantially at right angles to the first named axis.

27. Apparatus for intermittently delivering molten glass discharged from an outlet, comprising a chute mounted to swing into and out of the path of the discharged glass upon an axis substantially at right angles with said path, and means for swinging said axis upon a fixed axis located substantially coincident with said path.

28. Apparatus for delivering molten glass, having in combination an inclined chute onto which the glass is discharged, an annular journal supporting the chute for rotary movement on an axis substantially coincident with the path of the discharged glass and having a pivotal connection with the chute upon which connection the chute may be moved into the said path to receive the glass, and out of said path to allow the discharged glass to pass through the annular journal.

29. Apparatus for delivering molten glass, having in combination an inclined receiver onto which the glass is discharged, an annular journal having its axis substantially coincident with the path of the discharged glass, a horizontal pivot connecting the journal and the receiver at a level above its glass engaging portion, a latch to hold the receiver in position to deflect the discharged glass, and means to release the latch to permit the receiver to swing out of the path of the discharged glass.

30. The combination, with apparatus for delivering molten glass, of a receiver to receive the glass, and a support located outside the path of discharge of the glass, mounted for rotary movement on a fixed axis substantially in alignment with said path, the receiver being pivotally connected with the support for selective movement into or out of the path of the discharged glass.

31. In glass feeding and forming machinery, the combination with a furnace outlet, of apparatus for receiving mold charges therefrom and delivering them to the forming machinery consisting of a receiving and a delivering member, the receiving member being mounted for rotary motion around a vertical axis substantially in line with the furnace outlet for delivery of the charges to the forming machinery and also being mounted for rotary motion around a horizontal axis to discontinue or resume delivery of the charges to the forming machinery.

32. In a glass delivering apparatus, the combination of a two-part inclined conduit, a deflector, and means for moving one part of the conduit out of, and moving the deflector into, operative relation to the other part.

33. A glass delivering apparatus adapted to deliver mold charges from a feeding means to a plurality of sets of molds, comprising a swinging conduit associated with each set of molds, and adapted to deliver charges thereto, a distributer for receiving mold charges from said feeding means and successively delivering them to said conduits, and means for swinging each conduit into and out of receiving position, relative to said distributer.

34. A glass delivering apparatus adapted to deliver mold charges from a feeding means to a plurality of sets of molds, comprising a conduit associated with each set of molds, and adapted to deliver charges thereto, each conduit being pivotally movable on a horizontal axis into and out of charge-receiving position with respect to said feeding means, and means for moving each conduit on its said axis.

35. A glass delivering apparatus for conveying molten glass from a single feeding device to a plurality of sets of molds, embodying a plurality of multi-part conduits, distributing means for receiving mold charges from said feeding device and delivering them successively to said conduits, and means for independently moving each conduit to bring one part thereof out of charge-receiving position relative to said distributing means and a chute operated by the movement of said conduit for receiving the charge distributed to said conduit.

EDWARD H. LORENZ.